(12) United States Patent
Gobara

(10) Patent No.: US 9,049,656 B2
(45) Date of Patent: Jun. 2, 2015

(54) RECEIVING UNIT DRIVING CONTROL METHOD AND RECEIVING DEVICE

(71) Applicant: Seiko Epson Corporation, Tokyo (JP)

(72) Inventor: Naoki Gobara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/911,891

(22) Filed: Jun. 6, 2013

(65) Prior Publication Data

US 2013/0329769 A1  Dec. 12, 2013

(30) Foreign Application Priority Data

Jun. 8, 2012  (JP) .................................. 2012-130767

(51) Int. Cl.
  *H04B 1/00*  (2006.01)
  *H04W 52/02*  (2009.01)
  *G01S 19/34*  (2010.01)

(52) U.S. Cl.
  CPC ........... *H04W 52/0209* (2013.01); *G01S 19/34* (2013.01); *H04W 52/0245* (2013.01)

(58) Field of Classification Search
  CPC ............. G01S 19/34; H04W 52/0229; H04W 52/0245
  USPC ..................... 375/147, 150, 340; 342/357.74; 701/490
  See application file for complete search history.

(56) References Cited

U.S. PATENT DOCUMENTS

| 5,650,785 | A | * | 7/1997 | Rodal | 342/357.74 |
|---|---|---|---|---|---|
| 6,121,921 | A | * | 9/2000 | Ishigaki | 342/357.74 |
| 6,907,346 | B2 | * | 6/2005 | Teranishi et al. | 701/490 |
| 7,573,422 | B2 | * | 8/2009 | Harvey et al. | 342/357.74 |
| 8,130,816 | B2 | * | 3/2012 | Sudo et al. | 375/147 |
| 8,731,110 | B1 | * | 5/2014 | Zhou et al. | 375/316 |
| 2002/0027949 | A1 | * | 3/2002 | Lennen | 375/147 |
| 2007/0090994 | A1 | * | 4/2007 | Young | 342/358 |
| 2009/0168853 | A1 | * | 7/2009 | Gobara | 375/150 |
| 2012/0223860 | A1 | * | 9/2012 | Leclercq | 342/357.63 |

FOREIGN PATENT DOCUMENTS

| JP | 2001-042023 A | 2/2001 |
|---|---|---|
| JP | 2009-175123 A | 8/2009 |

\* cited by examiner

*Primary Examiner* — Sophia Vlahos
(74) *Attorney, Agent, or Firm* — Kilpatrick Townsend & Stockton LLP

(57) ABSTRACT

A code phase is detected on the basis of a signal received by an RF receiving circuit unit which is a receiving unit that receives a GPS satellite signal. When the code phase is within a predetermined edge of a PRN code, a control of suppressing intermittent driving of the RF receiving circuit unit is performed.

5 Claims, 10 Drawing Sheets

| CONDITION | OPERATING MODE |
|---|---|
| CAPTURING TARGET SATELLITE OF WHICH BTT IS NOT DETECTED AND IN WHICH SUPPRESSION CONDITION IS SATISFIED IS PRESENT | NORMAL MODE |
| CAPTURING TARGET SATELLITE OF WHICH BTT IS NOT DETECTED IS PRESENT BUT CAPTURING TARGET SATELLITE IN WHICH SUPPRESSION CONDITION IS SATISFIED IS NOT PRESENT | FIRST POWER SAVING MODE (INTERMITTENTLY WITH 1 ms) |
| DETECTION OF BTT OF ALL CAPTURING TARGET SATELLITES IS COMPLETED | SECOND POWER SAVING MODE (INTERMITTENTLY WITH 2 ms) |

FIG.12

RECEIVING UNIT DRIVING CONTROL METHOD AND RECEIVING DEVICE

This application claims priority to Japanese Patent Application No. 2012-130767, filed Jun. 8, 2012, the entirety of which is hereby incorporated by reference.

BACKGROUND

1. Technical Field

The present invention relates to a method of controlling driving of a receiving unit that receives a positioning satellite signal, and the like.

2. Related Art

A global positioning system (GPS) is widely known as a positioning system using a positioning satellite signal and is used for a receiving device built in a mobile phone, a car navigation apparatus, and the like. In the GPS, positions of plural GPS satellites, pseudo-distances from plural GPS satellites to a receiving device, and the like are calculated using the clocked time of a GPS receiver and a position calculating operation is finally performed.

Among such GPS receivers, a GPS receiver is known which performs an intermittent position calculating (intermittent positioning) operation by alternating a period in which the position calculating operation is performed and a period in which the position calculating operation is not performed for the purpose of reducing power consumption (for example, see JP-A-2001-42023 and JP-A-2009-175123).

However, the power saving technique is not limited to the techniques disclosed in JP-A-2001-42023 and JP-A-2009-175123.

SUMMARY

An advantage of some aspects of the invention is that it provides a new technique of realizing more power saving of a receiver that receives a positioning satellite signal.

A first aspect of the invention is directed to a receiving unit driving control method including: detecting a code phase based on a signal received by a receiving unit that receives a positioning satellite signal; and performing a control of suppressing intermittent driving of the receiving unit when the code phase is within a predetermined edge of a PRN code.

As another aspect of the invention, the invention may be configured as a receiving device including: a receiving unit that receives a positioning satellite signal; a code phase detecting unit that detects a code phase based on the positioning satellite signal received by the receiving unit; and a control unit that performs a control of suppressing intermittent driving of the receiving unit when the code phase is within a predetermined edge of a PRN code.

By intermittently driving the receiving unit that receives a positioning satellite signal, it is possible to realize power saving of a receiving device that receives a positioning satellite signal. However, when the receiving unit is intermittently driven in a state where the code phase is within a predetermined edge of a PRN code, the bit transition time of a navigation message may not be detected, details of which will be described later. Therefore, according to the first aspect or the like, a code phase is detected on the basis of a signal received by the receiving unit, and a control of suppressing intermittent driving of the receiving unit is performed when the detected code phase is within the predetermined edge of the PRN code.

As a second aspect of the invention, the receiving unit driving control method according to the first aspect of the invention may be configured such that the performing of the control includes suppressing the intermittent driving of the receiving unit when a bit transition timing of a navigation message included in the received signal is unknown and the code phase is within the predetermined edge.

According to the second aspect, when the bit transition time of the navigation message included in the received signal is unknown and the code phase is within the predetermined edge, the intermittent driving of the receiving unit may be suppressed. Accordingly, it is possible to appropriately control the driving of the receiving unit in consideration of the detection state of the bit transition timing of a navigation message.

As a third aspect of the invention, the receiving unit driving control method according to the first or second aspect of the invention may be configured such that the performing of the control includes intermittently driving the receiving unit regardless of whether the code phase is within the predetermined edge of the PRN code when a bit transition timing of a navigation message included in the received signal is known.

According to the third aspect, when the bit transition time of the navigation message included in the received signal is known, a condition of detecting the bit transition timing fails. Accordingly, by intermittently driving the receiving unit regardless of whether the code phase is within the predetermined edge of the PRN code, it is possible to realize power saving of the receiving device.

As a fourth aspect of the invention, the receiving unit driving control method according to any one of the first to third aspects of the invention may be configured such that the performing of the control includes intermittently driving the receiving unit with one cycle time of the PRN code included in the received signal as an intermittent interval.

According to the fourth aspect, it is possible to effectively reduce the power consumption of the receiving device by intermittently driving the receiving unit with one cycle time of a PRN code included in the received signal as an intermittent interval.

BRIEF DESCRIPTION OF THE DRAWINGS

The invention will be described with reference to the accompanying drawings, wherein like numbers reference like elements.

FIG. 12 is a diagram illustrating a table configuration example of an operating mode switching control table.

DESCRIPTION OF EXEMPLARY EMBODIMENTS

Hereinafter, an exemplary embodiment of the invention will be described with reference to the accompanying drawings. In this exemplary embodiment, the invention is applied to a global positioning system (GPS) which is a kind of positioning system. The invention is not limited to the below-described exemplary embodiment.

1. Principle (1) Operating Mode

In this exemplary embodiment, a GPS receiver is assumed which receives a GPS satellite signal emitted from a GPS satellite which is a kind of positioning satellite and which performs a position calculating operation. A GPS satellite signal is a positioning satellite signal spread-modulated in a spectrum spread manner with a PRN (Pseudo Random Noise) code known as a pseudo noise code. The PRN code is classified into two types of a coarse/acquisition) (C/A) code and a P code.

The GPS receiver includes an RF receiving circuit unit as a receiving unit that receives the GPS satellite signal and a baseband processing circuit unit that processes the GPS satellite signal received by the RF receiving circuit unit and that calculates a position. In this exemplary embodiment, the driving of the RF receiving circuit unit and the baseband processing circuit unit is controlled in any one operating mode of two types of operating modes. The two operating modes include a normal mode and a power saving mode.

The normal mode is a mode in which the RF receiving circuit unit and the baseband processing circuit unit are normally driven. In the normal mode, power consumption is the largest in all the operating modes so as to normally activate the RF receiving circuit unit and the baseband processing circuit unit.

The power saving mode is a mode in which power consumption is reduced by intermittently driving the RF receiving circuit unit and the baseband processing circuit unit. The operation state of the RF receiving circuit unit includes an ON state and an OFF state.

The ON state is a state where the RF receiving circuit unit is supplied with power from a power supply. That is, in this state, the RF receiving circuit unit performs circuit operations such as amplifying an RF signal received by the GPS antenna, down-converting the RF signal into an intermediate frequency signal, cutting an unnecessary frequency band component, and converting the received signal which is an analog signal into a digital signal.

The OFF state is a state where the RF receiving circuit unit is not supplied with power from the power supply circuit unit. That is, in this state, the RF receiving circuit unit does not perform the circuit operations.

Hereinafter, a period in the ON state is referred to as an "ON period" and a period in the OFF state is referred to as an "OFF period".

Figure 1:
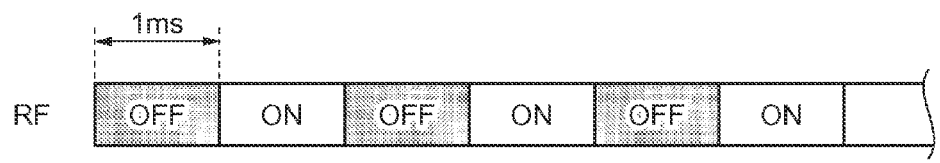
FIG. 1 is a diagram illustrating a power saving mode.

FIG. 1 is a diagram illustrating the power saving mode in this exemplary embodiment and shows an example of a variation in operating state of the RF receiving circuit unit. In the power saving mode, the RF receiving circuit unit is intermittently driven to change the OFF/ON states every 1 ms. The time "1 ms" is a time corresponding to one cycle time of a PRN code. Since the ON state and the OFF state are repeated every 1 ms, it can be said that an intermittent cycle is 2 ms.

In the power saving mode, a navigation message can be decoded. The RF receiving circuit unit does not continuously receive 1,500 bits (=30 seconds) corresponding to 1 frame of the navigation message. However, since the RF receiving circuit unit is in the ON state for 10 ms which is a half of the period of 20 ms which is a receiving time corresponding to 1 bit and receives data of the corresponding bit, data is not missed. Here, a data error (bit error) may occur due to a problem with receiving sensitivity.

(2) Detection of BTT

The baseband processing circuit unit performs a carrier removing operation or a correlation operation on a signal received by the RF receiving circuit unit and captures a GPS satellite (GPS satellite signal). Regarding the correlation operation, a correlation operation between the received signal and a replica code replicating the PRN code is performed to calculate a correlation value. This correlation operation is performed in the phase direction and the frequency direction to detect the code phase or the receiving frequency of the received GPS satellite signal.

In the GPS satellite signal, the PRN code is modulated in a binary phase shift keying (BPSK) manner depending on the bit value of a navigation message. Specifically, since the bit rate is 50 bps, the bit length of one bit of the navigation message is 20 ms. That is, the bit value of the navigation message may vary every 20 ms. When the correlation operation between the received signal and the replica code is performed, correlation values of which the signs are inverted are obtained before and after the bit value of the navigation message varies. Accordingly, when the correlation values are integrated over 20 ms which is the bit length of the navigation message, correlation values having different signs may be integrated.

In order to avoid this problem, it is necessary to detect the time (hereinafter, referred to as a "bit variation time") for the bit value of the navigation message to vary. The bit variation time is a time corresponding to a bit transition time (BTT) and the bit transition time is referred to as BTT in this exemplary embodiment.

Figure 2:
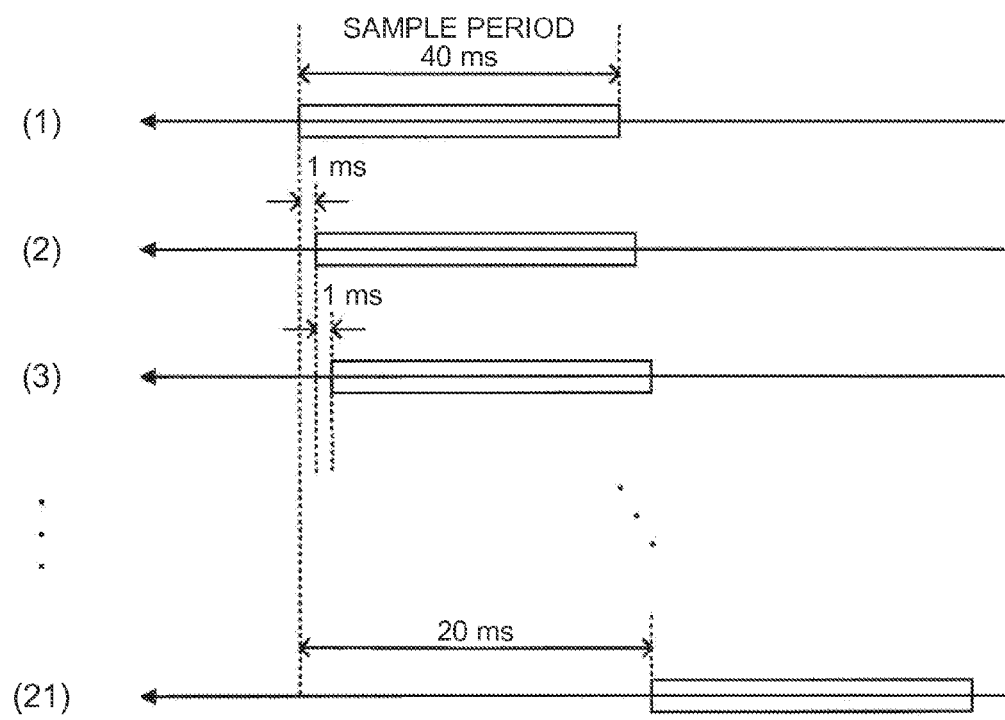
FIG. 2 is a diagram illustrating a BTT detecting method.

FIG. 2 is a diagram illustrating a BTT detecting method. In FIG. 2, arrows extending from the right to the left represent correlation values obtained by performing the correlation operation on the received signal and the replica code, and time-series variations of the correlation values from the right to the left are schematically illustrated.

In detecting a BTT, a period of a predetermined time having a given sample start time as a start point is set as a sample period, and an index value for detecting a BTT (hereinafter, referred to as a "BTT-detecting index value") is calculated using the correlation values (correlation operation result) in the sample period. The BTT-detecting index value is calculated while delaying the sample start time by a predetermined delay time.

In this example embodiment, the predetermined time defining the sample period is illustrated and described as "40 ms" which is double the bit length of the navigation message. That is, the period of 40 ms from the sample start time is defined as the sample period. In this exemplary embodiment, the delay time of the sample start time is illustrated and described as "1 ms" which is one cycle time of the PRN code. The head time of one cycle of the PRN code is referred to as "epoch". In this exemplary embodiment, the sample start time is an epoch.

Referring to FIG. 2, first, the BTT-detecting index value is calculated from the correlation value of the sample period of 40 ms from the given sample start time, as shown in (1) of FIG. 2. Then, as shown in (2) of FIG. 2, the sample period is determined with the time (the next epoch time) delayed by 1 ms from the sample start time shown in (1) of FIG. 2 as a sample start time, and the BTT-detecting index value is calculated from the correlation value of the period. The BTT-detecting index values are sequentially calculated in the same way.

Figure 3:
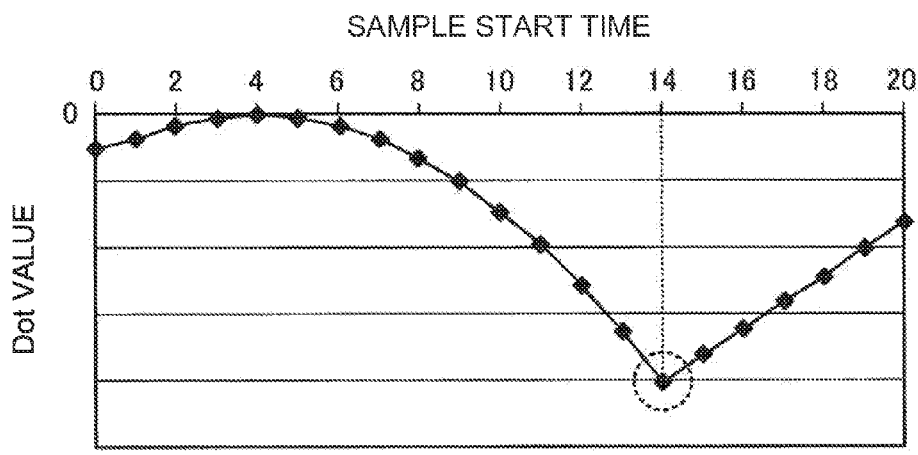
FIG. 3 is a diagram illustrating an example of a Dot value calculation result.

FIG. 3 is a diagram illustrating an example of an actual calculation result of a BTT-detecting index value. Here, an example where an index value called Dot value is calculated as the BTT-detecting index value. In FIG. 3, the horizontal axis represents the sample start time and the vertical axis represents the Dot value.

The Dot value is calculated by Expression (1).

$$\text{Dot}[j] = \sum_{k=j}^{k+19} I_k \sum_{k=j+20}^{k+19} I_k + \sum_{k=j}^{k+19} Q_k \sum_{k=j+20}^{k+19} Q_k \quad (1)$$

Here, "j" represents a number of the sample start time and "Dot[j]" represents a Dot value of the j-th sample start time. "k" represents a number of the correlation value calculated in the unit of 1 ms. "I" represents a correlation value (I-phase correlation value) of an in-phase component (I component) and "Q" represents a correlation value (Q-phase correlation value) of an orthogonal component (Q component).

The Dot value is calculated using an integrated correlation value obtained by integrating the correlation values in the period of 20 ms (hereinafter, referred to as "first half sample period") which is a first half of the sample period of 40 ms and an integrated correlation value obtained by integrating a period of 20 ms (hereinafter, referred to as "second half sample period") which is a second half of the sample period.

The calculated Dot value is the minimum at the sample start time corresponding to the BTT. In the example shown in FIG. 3, the Dot value is the minimum at the fourteenth sample start time (j=14). Therefore, it can be seen that the fourteenth sample start time is the BTT.

In this way, by calculating the BTT-detecting index value while delaying the sample start time by 1 ms, it is possible to detect the BTT. However, when the RF receiving circuit unit is intermittently driven using the power saving mode described with reference to FIG. 1, a problem occurs in detecting the BTT.

Figure 4:
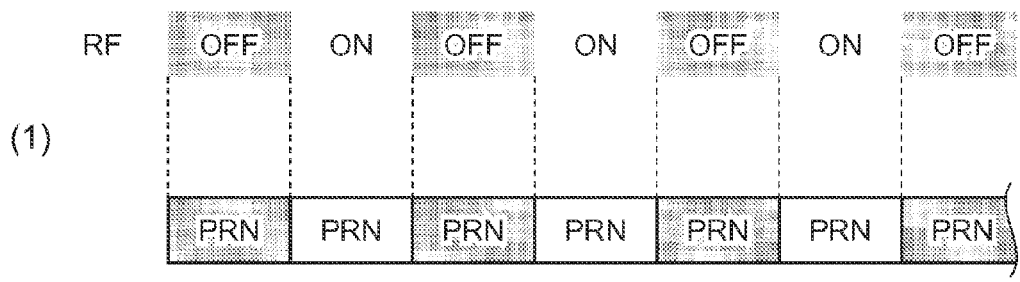
FIG. 4 is a diagram illustrating a relationship between an intermittent driving switching time and an epoch.
Figure 4:
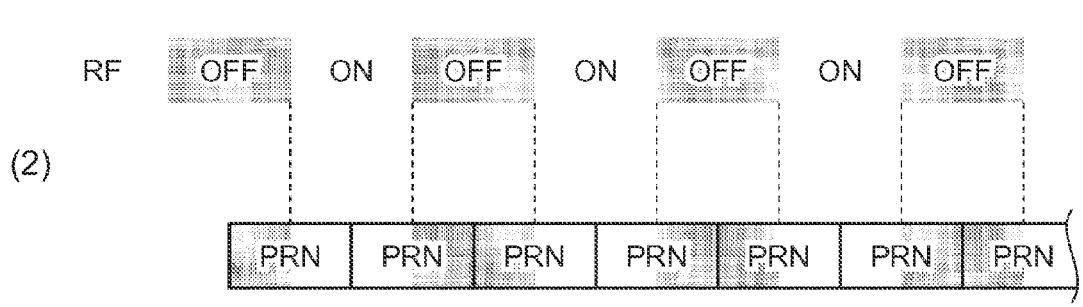

FIG. 4 is a diagram illustrating a relationship between an intermittent driving switching time and an epoch. One rectangle marked by PRN represents a correlation value corresponding to the PRN code of one cycle time. Since the intermittent driving time of the RF receiving circuit unit is controlled by the use of a code phase, the ON/OFF switching time of the RF receiving circuit unit is a time of the code phase.

When a code phase is expressed by a percentage of 0% to 100%, (1) of FIG. 4 shows a state where the code phase is 0% (=100%). In this state, the intermittent driving switching time just agrees to the epoch. On the other hand, (2) of FIG. 4 shows a state where the code phase is 50%. In this state, the intermittent driving switching time is an intermediate point (central time) between the epochs.

The intermittent driving switching time varies due to different code phases, and missing parts of the correlation values also vary as a result. When the code phase is 0%, the correlation value is missed every other PRN code. On the other hand, when the code phase is 50%, the correlation values of neighboring halves of neighboring PRN codes are repeatedly present and absent.

Figure 5:
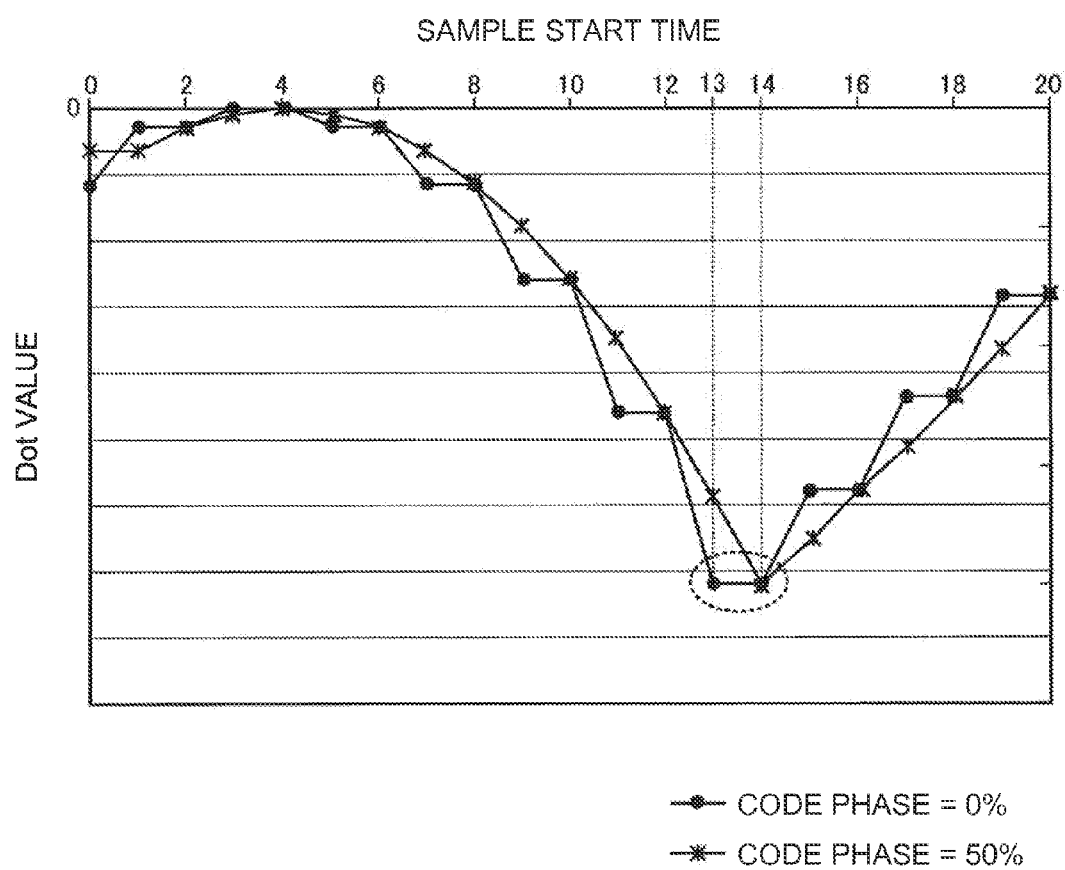
FIG. 5 is a diagram illustrating an example of a Dot value calculation result.

FIG. 5 is a diagram illustrating an example of the Dot value calculation results when the code phase is 0% and 50%. The Dot value when the code phase is 0% is plotted by "•", and the Dot value when the code phase is 50% is plotted by "*". The way of viewing of the drawing is the same as FIG. 3.

It can be seen from the results that when the code phase is 50%, the Dot value at the fourteenth sample start time (j=14) is the minimum and thus the sample start time can be determined to be the BTT. However, when the code phase is 0%, the Dot value is the minimum with the same value at two sample start times of the thirteenth sample start time (j=13) and the fourteenth sample start time (j=14). In this case, it is not possible to determine which sample start time is the BTT. The reason of this phenomenon will be described below.

Figure 6:
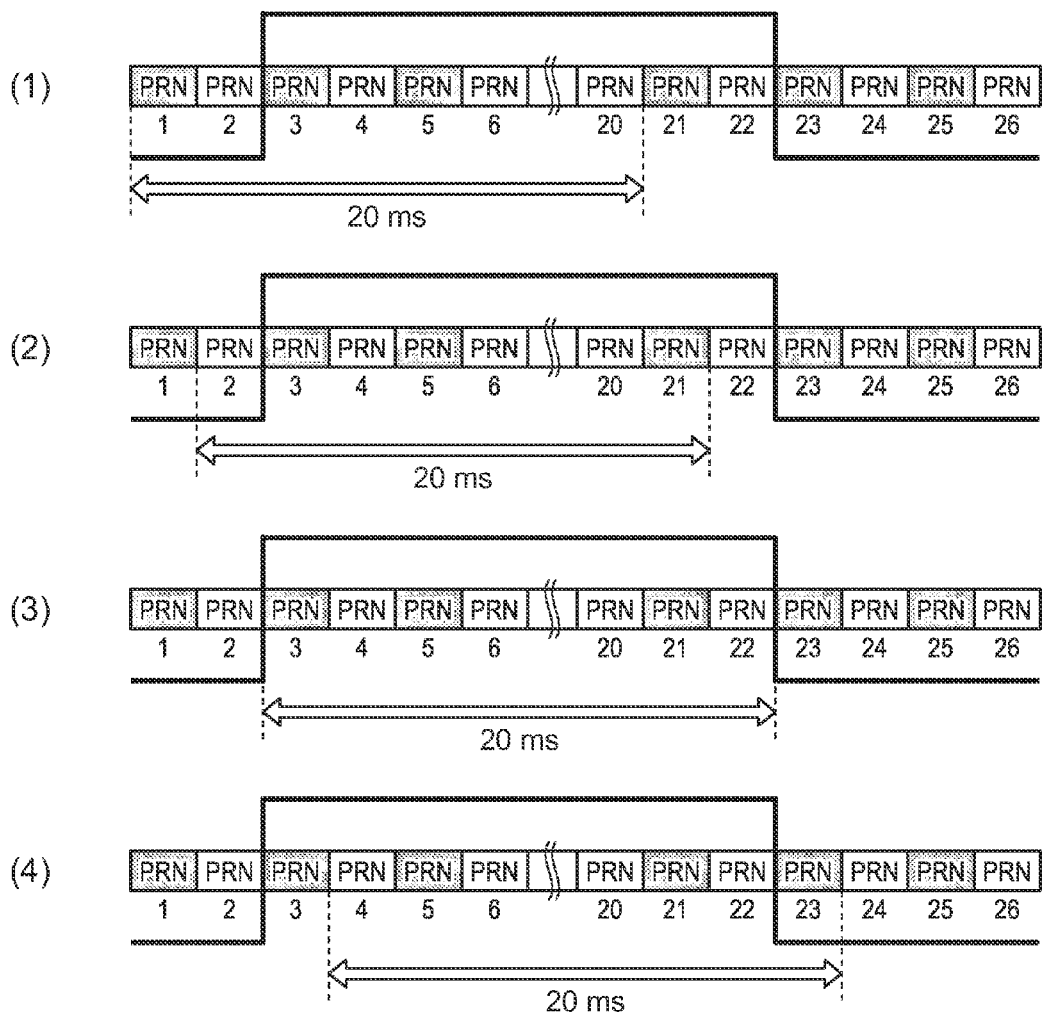
FIG. 6 is a diagram illustrating a case where a code phase is 0%.
Figure 7:
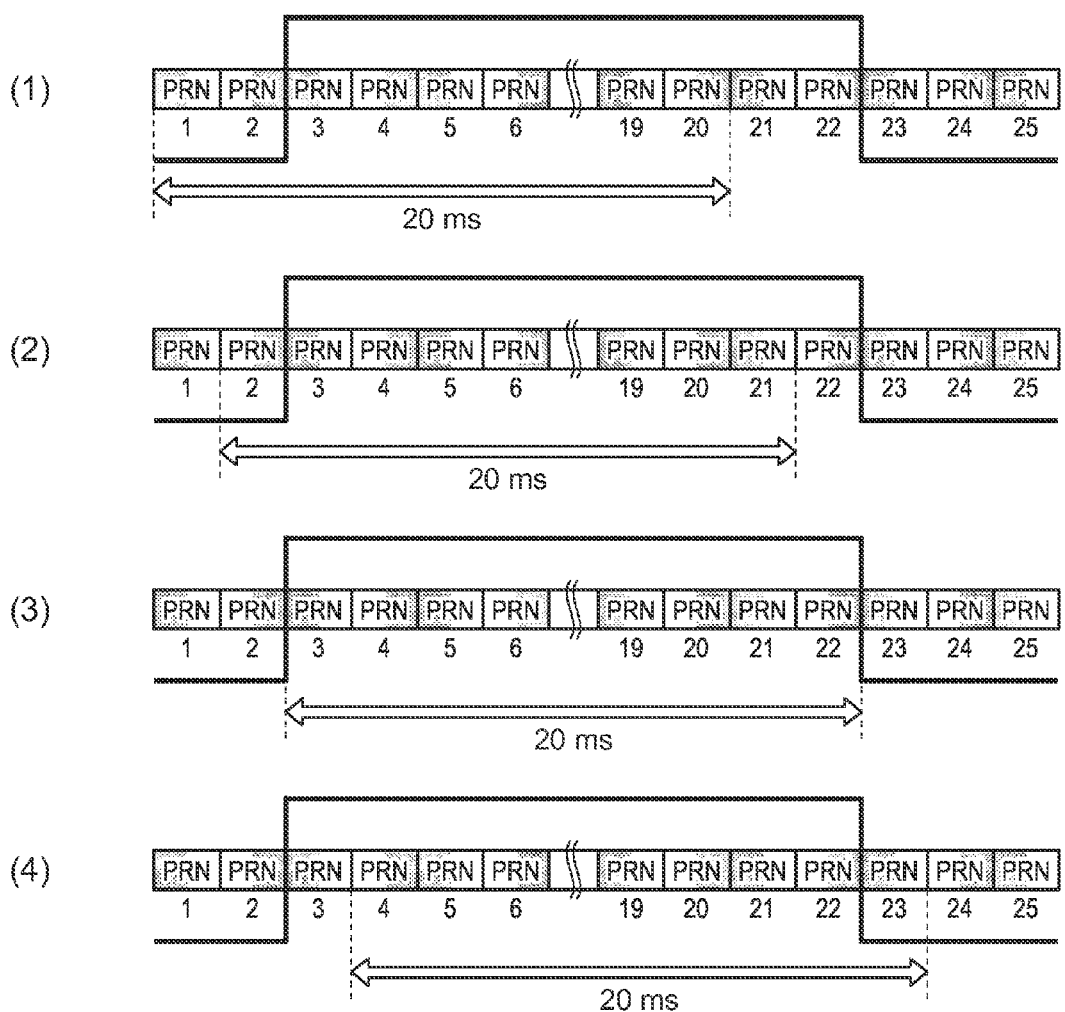
FIG. 7 is a diagram illustrating a case where a code phase is 50%.

FIGS. 6 and 7 are diagrams illustrating cases where the code phase is 0% (=100%) and 50%. These drawings combine FIGS. 2 and 4 and are complex, and thus a simple way of viewing thereof will be described below.

A variation in operating state (intermittent driving switching time) when the RF receiving circuit unit operates in the power saving mode is illustrated in the upper part of FIGS. 6 and 7. In (1) to (4), a relationship between the intermittent driving switching time and the first-half sample period and an example of a variation in bit value of the navigation message are illustrated. For the purpose of convenience, serial numbers are assigned to the PRN codes. The bit value of the navigation message is assumed to vary at the epoch of the third PRN code and the epoch of the twenty-third PDN code and is marked by a bold solid line. The period of 20 ms marked by a white arrow represents the first-half sample period. For the purpose of easy description, the second-half sample period is not shown.

FIG. 6 shows a case where the code phase is 0%. Since the code phase is 0%, the intermittent driving switching time agrees with the epoch.

(1) of FIG. 6 shows a case where the sample start time is the epoch of the first PRN code. In this case, the correlation values of the parts of the first to twentieth PRN codes are included in the first-half sample period.

However, since the correlation operation is not performed in the OFF period of the RF receiving circuit unit, the correlation values of the parts corresponding to the odd-numbered PRN codes are missed. As a result, only the correlation values of the parts corresponding to the even-numbered PRN codes are used to calculate the BTT-detecting index values. Specifically, the correlation values of the parts corresponding to ten PRN codes of second, fourth, sixth, . . . , and twentieth PRN codes are used.

(2) of FIG. 6 shows a case where the sample start time is the epoch of the second PRN code. In this case, the correlation values of the parts of the second to twenty-first PRN codes are included in the first-half sample period. Similarly to (1) of FIG. 6, only the correlation values of the parts corresponding to the even-numbered PRN codes are used to calculate the BTT-detecting index values. That is, the correlation values of the parts corresponding to ten PRN codes of second, fourth, sixth, . . . , and twentieth PRN codes are used.

It should be noted that the same correlation values are used to calculate the BTT-detecting index value in (1) of FIG. 6 and (2) of FIG. 6. Although not shown in the drawing, the same is true of the second-half sample period.

(3) of FIG. 6 shows a case where the sample start time is the epoch of the third PRN code and (4) of FIG. 6 shows a case where the sample start time is the epoch of the fourth PRN code. As described above, since the same correlation values are used to calculate the BTT-detecting index value in these two combinations, the same BTT-detecting index values are obtained.

In this way, when the code phase is 0%, the BTT-detecting index values in two combinations in which the sample start time is delayed are equal to each other. This is the reason that the same Dot values are obtained at two neighboring sample start times when the code phase is 0% in FIG. 5.

A case where the code phase is 50% will be described below with reference to FIG. 7.

(1) of FIG. 7 shows a case where the sample start time is the epoch of the first PRN code. In this case, the correlation values of the parts of the first PRN code to the twentieth PRN code are included in the first-half sample period. Since it is in the power saving mode, only the correlation values of the white parts in the drawing are actually used to calculate the BTT-detecting index value.

(2) of FIG. 7 shows a case where the sample start time is the epoch of the second PRN code.

It should be noted that the white parts of the correlation values used to calculate the BTT-detecting index value are different between (1) of FIG. 7 and (2) of FIG. 7, unlike the case where the code phase is 0%. The white portions of the correlation values are also different between (2) of FIG. 7 and (3) of FIG. 7. This is true of the second-half sample period. Therefore, when the BTT-detecting index values are calculated for the cases where the sample start time is delayed, the calculated values are different from each other.

In this way, when the code phase is 50%, the BTT-detecting index values differing depending on the sample start times are calculated. Paying attention to the Dot value when the code phase is 50% referring to FIG. 5 again, it can be confirmed that the values differing depending on the sample start times are calculated.

(3) Control of Power Saving Mode

As described above, when the code phase is 0% (=100%), the BTT-detecting index values are the same before and after delaying the sample start time, and there is a problem in that it is not possible to detect the BTT. However, when the code phase is 50%, this problem does not occur.

That is, this problem is a problem occurring in a range in which the code phase is close to an end such as 0% or 100%. More specifically, when the Dot value is calculated as the code phase slowly gets closer to 0% from 50%, in FIG. 5 there is a tendency that the Dot value slowly approaches from the graph with a code phase of 50% to the graph with a code phase of 0%. Therefore, in this exemplary embodiment, it is controlled whether to intermittently drive the RF receiving circuit unit on the basis of whether the code phase is within a predetermined edge of the RPN code.

Figure 8:
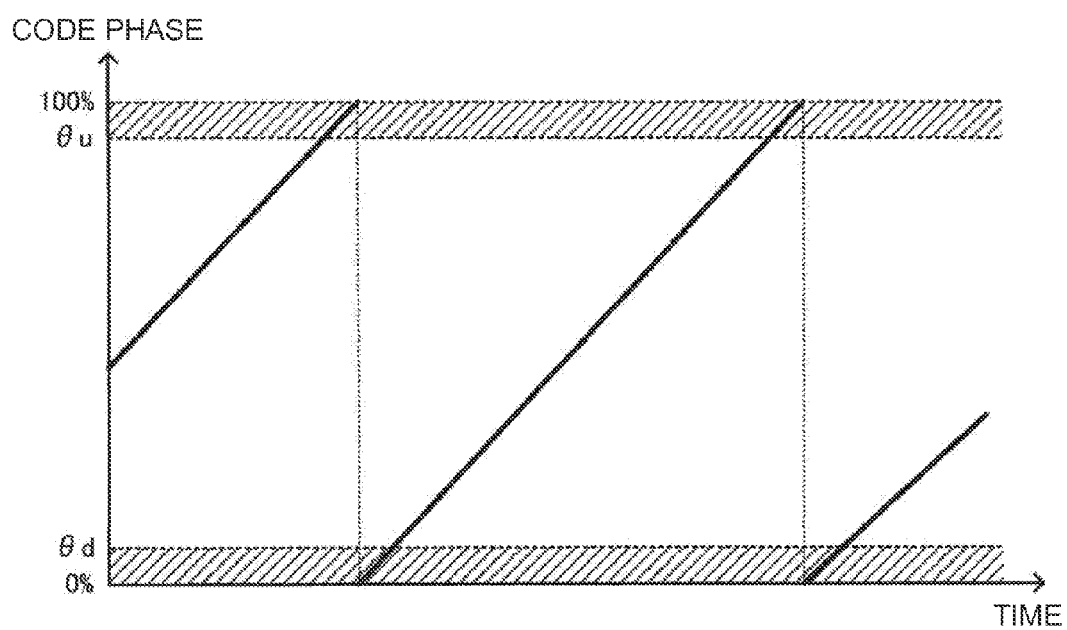
FIG. 8 is a diagram illustrating an intermittent driving suppressing control.

FIG. 8 is a diagram illustrating an intermittent driving control of the RF receiving circuit unit. In FIG. 8, the horizontal axis represents the time and the vertical axis represents the code phase (0% to 100%). In FIG. 8, the predetermined edges determined as edges of the code phase for suppressing the intermittent driving of the RF receiving circuit unit are hatched.

Since the relative positional relationship between a GPS satellite and the GPS receiver frequently varies, the pseudo-distance between the GPS satellite and the GPS receiver frequently varies and the code phase also varies. For example, as shown in FIG. 8, the code phase varies in a linear manner. When the code phase reaches 100%, the code phase rolls over and is returned to 0%.

In this exemplary embodiment, ranges indicated by "0% to $\theta d$" and "$\theta u$ to 100%" are defined as predetermined edges. "$\theta d$" and "$\theta u$" represent threshold values for determining the predetermined edges, respectively, and can be set, for example, to values of "$\theta d=5\%$ and $\theta u=95\%$".

A condition in which the code phase is within the predetermined edges is an example of the suppression conditions of suppressing the intermittent driving of the RF receiving circuit unit. That is, when the code phase is within the predetermined edges, the intermittent driving of the RF receiving circuit unit is suppressed by switching the operating mode from the power saving mode to the normal mode.

When the BTT is known, the navigation message can be correctly decoded on the basis of the BTT and it is thus not necessary to suppress the intermittent driving of the RF receiving circuit unit. Therefore, after detecting the BTT, it is suitable to realize the power saving of the GPS receiver as a whole by returning the operating mode to the power saving mode.

2. Example

An example of a receiving device that receives a GPS satellite signal will be described below. In this example, a mobile phone will be described as an electronic apparatus having a receiving device.

2-1. Configuration of Mobile Phone

Figure 9:
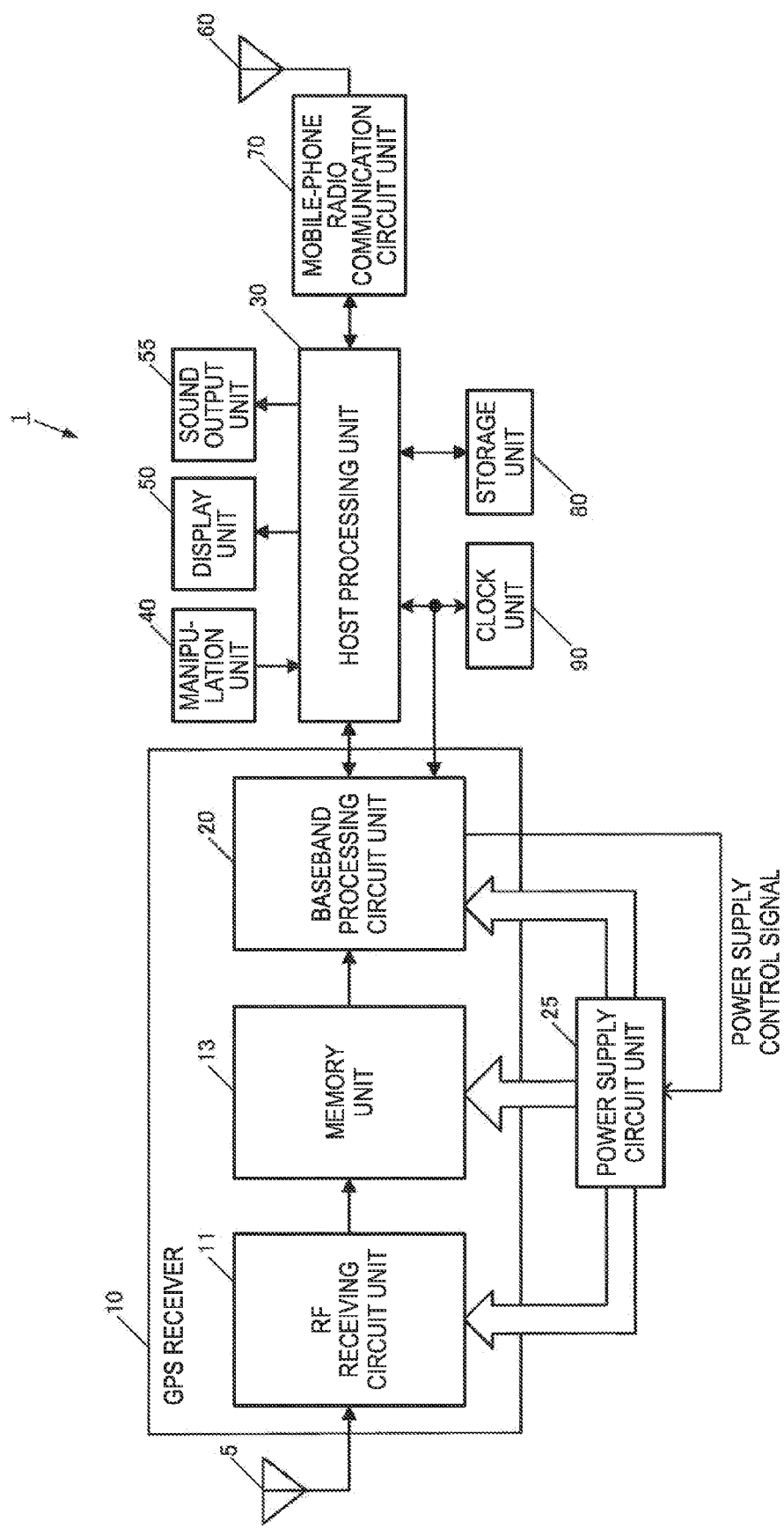
FIG. 9 is a block diagram illustrating an example of a functional configuration of a mobile phone.

FIG. 9 is a block diagram illustrating an example of a functional configuration of a mobile phone 1 according to this exemplary embodiment. The mobile phone 1 includes a GPS antenna 5, a GPS receiving unit 10, a power supply circuit unit 25, a host processing unit 30, a manipulation unit 40, a display unit 50, a sound output unit 55, a mobile-phone antenna 60, a mobile-phone Radio communication circuit unit 70, a storage unit 80, and a clock unit 90.

The GPS antenna 5 is an antenna that receives a radio frequency (RF) signal including a GPS satellite signal emitted from a GPS satellite, and outputs the received signal to the GPS receiving unit 10.

The GPS receiving unit 10 is a circuit or a device that calculates the position of the mobile phone 1 on the basis of the signal output from the GPS antenna 5 and is a functional block corresponding to a so-called GPS receiver. In this exemplary embodiment, the GPS receiving unit 10 corresponds to the receiving device.

The GPS receiving unit 10 includes an RF receiving circuit unit 11, a memory unit 13, and a baseband processing circuit unit 20. The RF receiving circuit unit 11, the memory unit 13, and the baseband processing circuit unit 20 may be manufactured as individual large scale integration (LSI) chips or as a single chip.

The RF receiving circuit unit 11 is a receiving circuit of an RF signal and corresponds to the receiving unit that receives a GPS satellite signal carrying a navigation message. As the circuit configuration of the RF receiving circuit unit 11, for example, a receiving circuit that converts an RF signal output from the GPS antenna 5 into a digital signal by the use of an A/D converter and processes the digital signal may be configured. A receiving circuit may be configured to process the RF signal output from the GPS antenna 5 as an analog signal, to finally convert the processed signal in an A/D conversion manner, and to output the digital signal to the memory unit 13.

In the latter, for example, the RF receiving circuit unit 11 may be configured as follows. That is, an RF signal-multiplication oscillation signal is generated by dividing or multiplying a predetermined oscillation signal. By multiplying the generated oscillation signal by the RF signal output from the GPS antenna 5, the RF signal is down-converted into a signal of an intermediate frequency (hereinafter, referred to as an "IF" signal"). Then, the IF signal is amplified and then is converted into a digital signal by the use of an A/D converter, and the digital signal is output to the memory unit 13.

The memory unit 13 is a storage unit that stores data of the received signal down-converted by the RF receiving circuit unit. Regardless of the operating mode of the RF receiving circuit unit 11, data of the received signal output from the RF receiving circuit unit 11 is cumulatively written thereto.

The baseband processing circuit unit 20 performs operations of capturing and tracking a GPS satellite signal, such as removing a carrier or performing a correlation operation, using data of the received signal stored in the memory unit 13 to capture and track a GPS satellite signal. The baseband processing circuit unit calculates the position or the clock error of the mobile phone 1 using time data or satellite orbit data extracted from the GPS satellite signal.

The power supply circuit unit 25 includes a power supply circuit that supplies power to the GPS receiving unit 10. The power supply circuit unit 25 supplies power to the functional units (the RF receiving circuit unit 11, the memory unit 13, and the baseband processing circuit unit 20) of the GPS receiving unit 10 in response to a power supply control signal output from the baseband processing circuit unit 20. The intermittent driving of the RF receiving circuit unit 11 which is one feature of this exemplary embodiment is embodied through the power supply control by the baseband processing circuit unit 20.

The host processing unit 30 is a processor that comprehensively controls the units of the mobile phone 1 in accordance with various programs such as a system program stored in the storage unit 80, and includes a processor such as a central processing unit (CPU). The host processing unit 30 displays a map on which a current position is marked on the display unit 50 or uses the position coordinate thereof for various application processes on the basis of the position coordinate acquired from the baseband processing circuit unit 20.

The manipulation unit 40 is an input device including, for example, a touch panel or button switches, and outputs a signal of a pressed key or button to the host processing unit 30. By manipulation of the manipulation unit 40, various instructions such as a call request, a request for e-mail transmission and reception, requests for executing various applications, and a request for position calculation are input.

The display unit 50 is a display device including a liquid crystal display (LCD) or the like and displays a variety of information based on a display signal output from the host processing unit 30. A position display picture, time information, or the like is displayed on the display unit 50.

The sound output unit 55 is a sound output device including a speaker or the like and outputs various sounds based on a sound output signal output from the host processing unit 30. A sound in call, audio guidance relevant to various applications, and the like are output from the sound output unit 55.

The mobile-phone antenna 60 is an antenna used to transmit and receive a mobile-phone radio signal to and from a wireless base station installed by the communication service provider of the mobile phone 1.

The mobile-phone radio communication circuit unit 70 is a communication circuit unit of a mobile phone including an RF conversion circuit and a baseband processing circuit and realizes calls or transmission and reception of e-mails by modulating and demodulating the mobile-phone radio signal.

The storage unit 80 includes a storage device such as a ROM (Read Only Memory), a flash ROM, and a RAM (Random Access Memory) and stores a system program allowing the host processing unit 30 to control the mobile phone 1, various programs for performing various application processes, or data.

The clock unit 90 is an internal clock of the mobile phone 1 and includes a crystal oscillator including a quartz vibrator and an oscillation circuit. The clocked time of the clock unit 90 is frequently output to the baseband processing circuit unit 20 and the host processing unit 30. The clocked time of the clock unit 90 is corrected on the basis of the clock error calculated by the baseband processing circuit unit 20.

2-2. Circuit Configuration of Baseband Processing Circuit Unit

Figure 10:
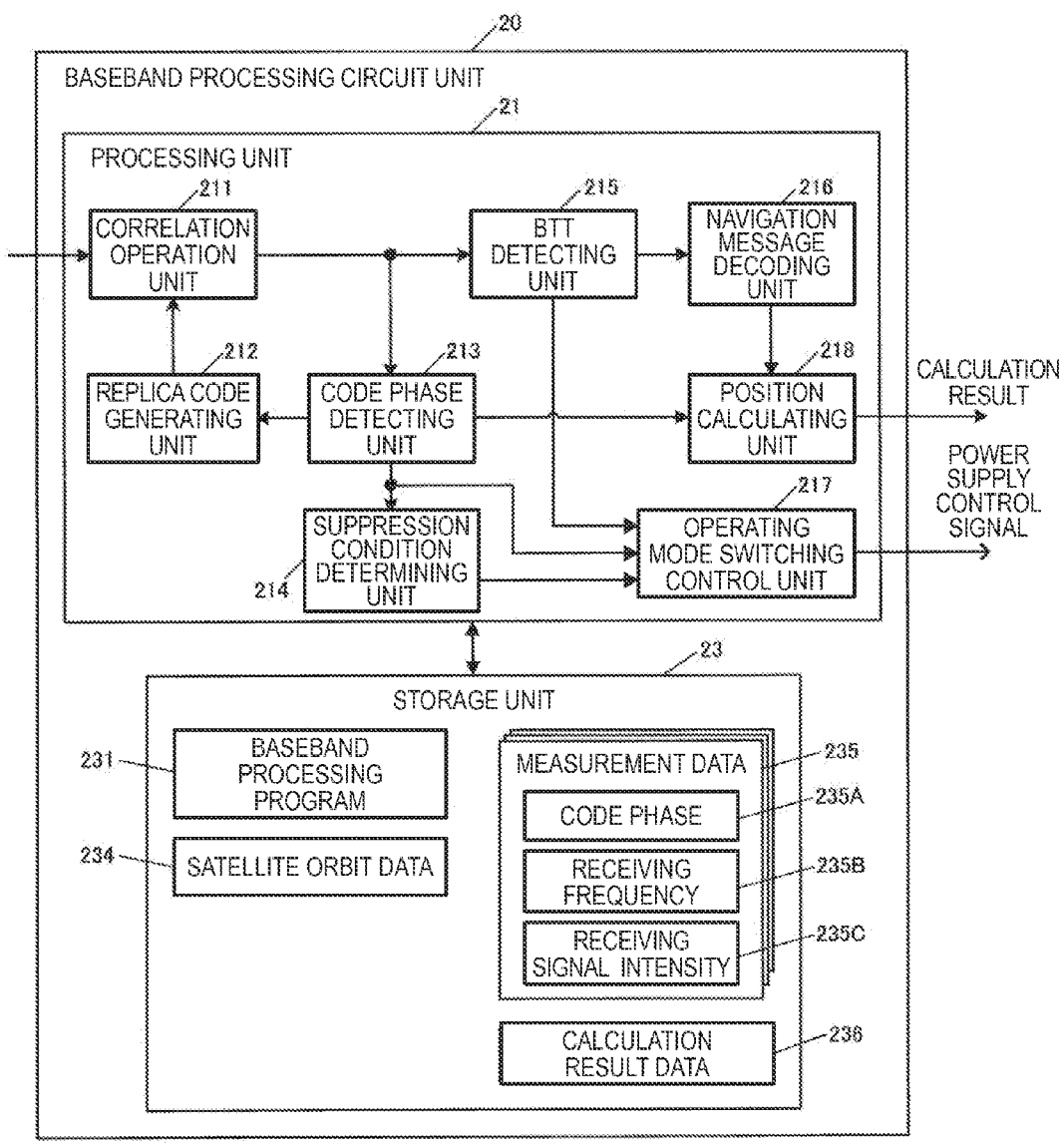
FIG. 10 is a diagram illustrating an example of a circuit configuration of a baseband processing circuit unit.

FIG. 10 is a diagram illustrating the circuit configuration of the baseband processing circuit unit 20 and is a diagram illustrating circuit blocks of this example. The baseband processing circuit unit 20 includes a processing unit 21 and a storage unit 23 as main functional units.

The processing unit 21 is an arithmetic and control unit that collectively controls the functional units of the baseband processing circuit unit 20 and includes a processor such as a CPU or a DSP (Digital Signal Processor).

The processing unit 21 includes a correlation operation unit 211, a replica code generating unit 212, a code phase detecting unit 213, a suppression condition determining unit 214, a BTT detecting unit 215, a navigation message decoding unit 216, an operating mode switching control unit 217, and a position calculating unit 218 as main functional units. These functional units are only examples and all of these functional units are not essential elements. Other functional units may be used as essential elements.

The correlation operation unit 211 performs a correlation operation between data of the received signal stored in the memory unit 13 and the replica code generated by the replica code generating unit 212. The correlation operation unit 211 performs a correlation operation of data of the I component and the Q component of the received signal with the replica code. When the RF receiving circuit unit 11 is driven in the power saving mode, the received signal is intermittent data and thus the correlation operation result is also intermittently output.

The replica code generating unit 212 generates a replica code replicating the PRN code of a GPS satellite to be captured.

The code phase detecting unit 213 detects a code phase by delaying the replica code generation time in the replica code generating unit 212 (through the so-called search in the phase direction). Specifically, by controlling the replica code generating unit 212 to determine the phase of the replica code of which the correlation value is the maximum on the basis of the correlation operation result of the correlation operation unit 211, the determined phase of the maximum correlation value is detected as the code phase. The code phase detecting unit 213 and the replica code generating unit 212 serve as a tracking loop of a GPS satellite signal.

The suppression condition determining unit 214 determines whether the suppression condition of suppressing the power saving mode (the intermittent driving) is satisfied, by determining whether the code phase detected by the code phase detecting unit 213 is within the predetermined edges.

The BTT detecting unit 215 calculates the BTT-detecting index value (for example, Dot value) using the correlation value calculated by the correlation operation unit 211 and detects the BTT using the calculated BTT-detecting index value.

The navigation message decoding unit 216 decodes the navigation message using the BTT detected by the BTT detecting unit 215.

The operating mode switching control unit 217 generates and outputs a power supply control signal for controlling the switching of the operating mode on the basis of the suppression condition determination result in the suppress condition determining unit 214 and the BTT detection result in the BTT detecting unit 215. The operating mode switching control unit includes an ON/OFF switching signal in a power saving mode in the power supply control signal on the basis of the code phase detected by the code phase detecting unit 213.

The position calculating unit 218 performs a predetermined position calculating process using a pseudo-distance on the basis of the navigation message decoded by the navigation message decoding unit 216 and the code phase detected by the code phase detecting unit 213, and calculates the position (position coordinate) and the clock error (clock bias) of the mobile phone 1. The position calculating process can be realized as a process employing a technique such as a least square method or a Kalman filter.

The storage unit 23 stores a system program of the baseband processing circuit unit 20, various programs for performing various functions such as a driving control function, a satellite capturing function, and a position calculating function, data, and the like. The storage unit has a work area for temporarily storing data in process, process result, and the like of various processes.

The storage unit 23 stores a baseband processing program 231 which is read and executed as a baseband process (see FIG. 11) by the processing unit 21. The baseband process will be described in detail later with reference to a flowchart.

The storage unit 23 stores satellite orbit data 234, measurement data 235, and calculation result data 236 as significant data.

The satellite orbit data 234 is data such as an almanac or an ephemeris of each GPS satellite. The satellite orbit data 234 is acquired by decoding the navigation message from the received signal, and is also acquired as assist data, for example, from a base station of the mobile phone 1 or an assistant server.

The measurement data 235 includes various quantities relevant to the captured GPS satellite, such as a code phase 235A, a receiving frequency 235B, and a received signal intensity 235C.

The calculation result data 236 is data of the calculation result acquired by causing the position calculating unit 218 to perform a position calculating process, and includes the calculated position or clock error of the mobile phone 1.

2-3. Flow of Processes

Figure 11:
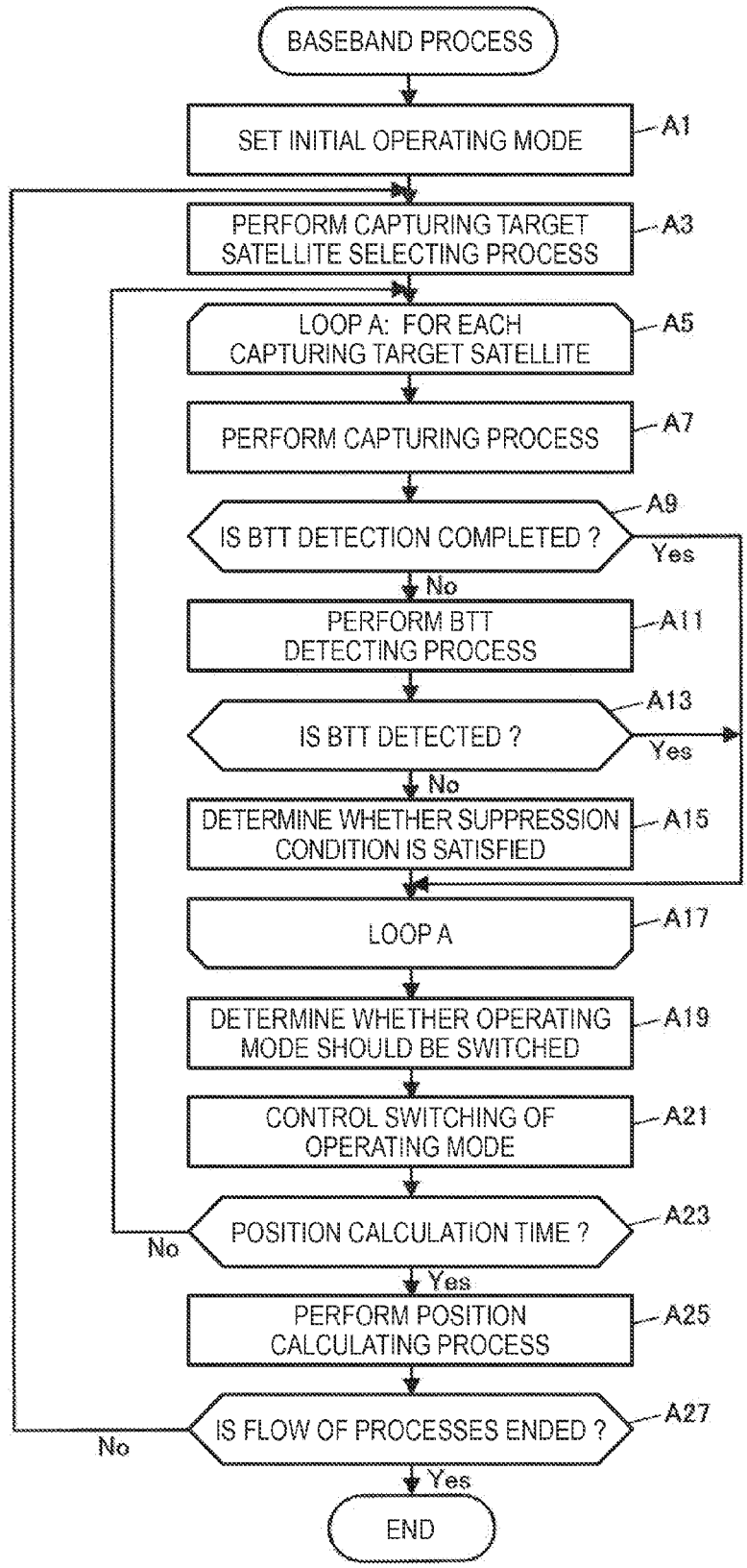
FIG. 11 is a flowchart illustrating a flow of a baseband process.

FIG. 11 is a flowchart illustrating a flow of a baseband process performed by the processing unit 21 in accordance with the baseband processing program 231 stored in the storage unit 23.

First, the processing unit 21 initially sets the operating mode (step A1). Specifically, the processing unit sets the power saving mode as the initial operating mode. The processing unit does not need to set the initial operating mode to the power saving mode, but may set the initial operating mode to the normal mode.

Subsequently, the processing unit 21 performs a capturing target satellite selecting process (step A3). Specifically, a GPS satellite located in the sky of the mobile phone 1 at the current date and time clocked by the clock unit 90 is determined and selected as a capturing target satellite using the satellite orbit data 234 such as an almanac or an ephemeris.

Then, the processing unit 21 performs the processes of loop A for each capturing target satellite (steps A5 to A17). In the processes of loop A, the processing unit 21 performs a process of capturing the capturing target satellite (step A7). Specifically, the correlation operation unit 211 performs a correlation operation on data of the received signal stored in the memory unit 13 and the replica code relevant to the capturing target satellite generated by the replica code generating unit 212. The code phase detecting unit 213 detects the code phase 235A of the GPS satellite signal received from the capturing target satellite on the basis of the correlation value calculated by the correlation operation unit 211, and stores the detected code phase as the measurement data 235 in the storage unit 23.

Thereafter, the processing unit 21 determines whether the detection of the BTT on the capturing target satellite is completed (step A9). When it is determined that the detection is completed (YES in step A9), the navigation message decoding unit 216 decodes the navigation message using the detected BTT. The processing unit 21 performs the flow of processes on a next capturing target satellite. On the other hand, when it is determined that the detection of the BTT is not completed (NO in step A9), the BTT detecting unit 215 performs a BTT detecting process of detecting the BTT of the navigation message on the capturing target satellite (step A11).

Subsequently, the processing unit 21 determines whether the BTT is detected (step A13), and performs the flow of processes on a next capturing target satellite when it is determined that the BTT is detected (YES in step A13). When the BTT is detected, the navigation message decoding unit 216 decodes the navigation message using the detected BTT. Then, the processing unit 21 performs the flow of processes on a next capturing target satellite.

On the other hand, when it is determined that the BTT is not detected (NO in step A13), the suppression condition determining unit 214 determines whether the suppression condition is established on the capturing target satellite (step A15). Specifically, the suppression condition determining unit determines whether the code phase 235A detected by the code phase detecting unit 213 through the capturing process on the capturing target satellite is within the predetermined edges. Then, the processing unit 21 performs the flow of processes on a next capturing target satellite.

When the processes of steps A7 to A15 are performed on all the capturing target satellites, the processing unit 21 ends the processes of loop A (step A17).

Subsequently, the operating mode switching control unit 217 determines whether the operating mode should be switched on the basis of the BTT detection result on the respective capturing target satellite and the determination result of the suppression condition (step A19). Specifically, when the operating mode is set to the power saving mode, a capturing target satellite of which the BTT is not detected remains, and the suppression condition on the capturing target satellite is satisfied, the operating mode switching control unit determines that the operating mode is switched to the normal mode. On the other hand, when the operating modes is set to the normal mode and the BTT detection of all the capturing target satellites is completed, or a capturing target satellite of which the BTT is not detected remains but the suppression condition on the capturing target satellite is not satisfied, the operating mode switching control unit determines that the operating mode is switched to the power saving mode.

Subsequently, the operating mode switching control unit 217 controls the switching of the operating mode on the basis of the determination result of the operating mode switching (step A21). The processes of steps A19 and A21 correspond to intermittently driving the receiving unit (the RF receiving circuit unit 11) when the BTT is unknown and the code phase is not within the predetermined edges, and suppressing the intermittent driving of the receiving unit (the RF receiving circuit unit 11) when the BTT is unknown and the code phase is within the predetermined edges. The processes correspond to intermittently driving the receiving unit (the RF receiving circuit unit 11) regardless of whether the code phase is within the predetermined edges when the BTT is known.

Then, the processing unit 21 determines whether a position calculation time comes in (step A23). For example, times of predetermined time intervals can be determined as the position calculation time. For example, the position calculation is performed every 1 second and the elapsed time for each second can be determined as the position calculation time. Otherwise, for example, a time instructed by a user to calculate a position may be determined as the position calculating time.

When it is determined that the position calculation time does not come in (NO in step A23), the processing unit 21 performs the process of step A5 again. That is, until the position calculating time comes in, the operating mode switching determination is performed on the same capturing target satellite and the operating mode is switched. These processes are repeatedly performed, for example, every 20 ms.

On the other hand, when it is determined that the position calculation time comes in (YES in step A23), the position calculating unit 218 performs a position calculating process of calculating the position and the clock error of the mobile phone 1 using the code phase detected by the code phase detecting unit 213 and the navigation message decoded by the navigation message decoding unit 216 (step A25). The calculation result is stored as the calculation result data 236 in the storage unit 23.

Subsequently, the processing unit 21 determines whether the flow of processes should be ended (step A27), and performs the process of step A3 again when it is determined that the flow of processes should not be ended (NO in step A27). When it is determined that the flow of processes should be ended (YES in step A27), the baseband process is ended.

3. Operational Advantages

When the RF receiving circuit unit is intermittently driven at an intermittent interval of 1 ms and the code phase is within the predetermined edges, it may not be possible to detect the BTT. Therefore, when the code phase is within the predetermined edges, it is possible to appropriately control the driving of the receiving unit in consideration of both the power saving of the GPS receiver and the detection of the BTT, by suppressing the intermittent driving of the RF receiving circuit unit.

When the BTT is unknown and the code phase is not within the predetermined edges, priority is given to reducing the power consumption by intermittently driving the RF receiving circuit unit. On the other hand, when the BTT is unknown and the code phase is within the predetermined edges, priority is given to the detection of the BTT by suppressing the intermittent driving of the RF receiving circuit unit.

In this exemplary embodiment, the RF receiving circuit unit is intermittently driven using 1 ms, which corresponds to one cycle time of a PRN code included in the received GPS satellite signal, as the intermittent interval. Accordingly, it is possible to effectively reduce the power consumption of the GPS receiver.

4. Modification Example

The invention is not limited to the above-mentioned examples and can be modified in various forms without departing from the concept of the invention. Modification examples of the invention will be described below.

4-1. Intermittent Cycle

Although it has been described in the above-mentioned exemplary embodiment that the intermittent interval for intermittently driving the RF receiving circuit unit is set to 1 ms (intermittent cycle=2 ms), this is only an example. Specifically, the intermittent interval may be set to a time interval longer than 1 ms, for example, 2 ms (intermittent cycle=4 ms). In this case, the RF receiving circuit unit is intermittently driven so as to switch the ON period and the OFF period every 2 ms, like the ON period of 2 ms→the OFF period of 2 ms→the ON period of 2 ms→....

For the purpose of convenience, the operating mode in which the RF receiving circuit unit is intermittently driven using the intermittent interval described above as 1 ms is referred to as a "first power saving mode". The operating mode in which the RF receiving circuit unit is intermittently driven at an intermittent interval of 2 ms is referred to as a "second power saving mode".

In the first power saving mode, when the code phase is not within the predetermined edges, it is possible to detect the BTT using the BTT-detecting index value. On the contrary, in the second power saving mode, since the RF receiving circuit unit is in the OFF period every 2 ms, the correlation value is missed every 2 ms. In this case, even when it is intended to calculate the BTT-detecting index value and to detect the BTT, the data of the correlation value lacks and it is thus not possible to detect the BTT.

Therefore, when the RF receiving circuit unit is intermittently driven in the second power saving mode, the second power saving mode is suppressed regardless of whether the code phase is within the predetermined edges. That is, when the BTT is unknown, the RF receiving circuit unit is not intermittently driven in the second power saving mode.

The RF receiving circuit unit may be intermittently driven using the first power saving mode and the second power saving mode together. In this case, the operating mode can be switched between the normal mode, the first power saving mode, and the second power saving mode depending on a predetermined condition.

FIG. 12 is a diagram illustrating the switching control of the operating mode in this case and shows a table (operating mode switching control table) for controlling the switching of the operating mode. Conditions and operating modes are correlated with each other in the operating mode switching control table.

When a capturing target satellite of which the BTT is not detected and in which the suppression condition is satisfied is present, the operating mode is determined to be switched to the normal mode. When a capturing target satellite of which the BTT is not detected is present but a capturing target satellite in which the suppression condition is satisfied is not present, the operating mode is determined to be switched to the first power saving mode. When the detection of the BTT on all the capturing target satellites is completed, the operating mode is determined to be switched to the second power saving mode.

Although it has been stated that the operating mode in which the RF receiving circuit unit is intermittently driven at an intermittent interval of 2 ms is set to the second power saving mode, the operating mode in which the RF receiving circuit unit is intermittently driven at an intermittent interval (for example, 4 ms) longer than 2 ms may be set to the second power saving mode.

4-2. BTT-Detecting Index Value

Although it has been stated in the above-mentioned embodiment that the Dot value is used as the BTT-detecting index value, the BTT-detecting index value is not limited to the Dot value.

For example, a power value calculated by Expression (2) may be used as the BTT-detecting index value.

$$\text{Power}[j] = \left(\sum_{k=j}^{k+19} I_k + \sum_{k=j+20}^{k+19} I_k\right)^2 + \left(\sum_{k=j}^{k+19} Q_k + \sum_{k=j+20}^{k+19} Q_k\right)^2 \quad (2)$$

Here, Power[j] represents the power value relevant to the j-th sample start time.

When the power value is used as the BTT-detecting index value, the power value is calculated while delaying the sample start time by 1 ms. The sample start time in which the power value is the maximum can be detected as the BTT.

4-3. Return to Power Saving Mode

Although it has been stated in the above-mentioned embodiment that the condition in which the detection of the BTT of all the capturing target satellites is completed is one condition for returning the operating mode to the power saving mode, this may be set as follows.

A predetermined number of capturing target satellites is selected out of capturing satellites on the basis of the received signal intensity 235C acquired as the measurement data 235. Specifically, for example, capturing target satellites (for example, four satellites or five satellites) of equal to or more than the minimum number necessary for calculating a position are selected in the order of decreasing the received signal intensity 235C. When the detection of the BTT of all the selected capturing target satellites is completed and another capturing target satellite of which the BTT is not detected is present, the operating mode is returned to the power saving mode.

A predetermined number of capturing target satellites may be selected in the order of increasing the received signal intensity 235C and the selected capturing target satellites may be excluded from the determination on whether the power saving mode should be suppressed. That is, the power saving mode is not suppressed for a satellite having a weak received signal intensity 235C, even when the code phase thereof is within the predetermined edges (even when the suppression condition is satisfied).

4-4. Switching Determination of Operating Mode

Although it has been stated in the above-mentioned embodiment that the operating mode switching control unit 217 determines whether the operating mode should be switched on the basis of the detection result of the BTT of each capturing target satellite and the determination result of the suppression condition, it may be determined whether the operating mode should be switched on the basis of the determination result of the suppression condition without using the detection result of the BTT.

4-5. Processing Subject

Although it has been stated in the above-mentioned exemplary embodiment that the driving control of the RF receiving circuit unit is performed by the processing unit of the baseband processing circuit unit, the driving control may be performed by a host processing unit of an electronic apparatus.

4-6. Electronic Apparatus

Although it has been stated in the above-mentioned exemplary embodiment that the invention is applied to the mobile phone which is a kind of electronic apparatus, the invention is not limited to the mobile phone. For example, the invention may be similarly applied to electronic apparatuses such as a car navigation apparatus, a portable navigation apparatus, a PC, a PDA (Personal Digital Assistant), and a wristwatch.

4-7. Satellite Positioning System

Although the GPS has been exemplified as the satellite positioning system in the above-mentioned exemplary embodiment, other satellite positioning systems such as WAAS (Wide Area Augmentation System), QZSS (Quasi Zenith Satellite System), GLONASS (GLObal NAvigation Satellite System), and GALILEO may be used.

What is claimed is:

1. A receiving unit driving control method comprising:
   detecting a code phase based on a signal received by a receiving unit that receives a positioning satellite signal;
   determining, based on at least the code phase, whether to operate the receiving unit in a first mode in which the receiving unit is constantly driven or in a second mode in which the receiving unit is intermittently driven; and
   operating the receiving unit in the first mode in which the receiving unit is constantly driven when the code phase is within a predetermined edge of a pseudorandom noise (PRN) code.

2. The receiving unit driving control method according to claim 1, wherein the receiving unit is operated in the first mode when a bit transition timing of a navigation message included in the received signal is unknown and the code phase is within the predetermined edge.

3. The receiving unit driving control method according to claim 2, wherein when a bit transition timing of a navigation message included in the received signal is known, the receiving unit is operated in the second mode regardless of whether the code phase is within the predetermined edge of the PRN code.

4. The receiving unit driving control method according to claim 1, wherein in the second mode, the receiving unit is intermittently driven with one cycle time of the PRN code included in the received signal as an intermittent interval.

5. A receiving device comprising:
   a receiving unit that receives a positioning satellite signal;
   a code phase detecting unit that detects a code phase based on the positioning satellite signal received by the receiving unit; and
   a control unit that determines, based on at least the code phase, whether to operate the receiving unit in a first mode in which the receiving unit is constantly driven or in a second mode in which the receiving unit is intermittently driven based on at least the code phase, wherein the receiving unit is operated in the first mode in which the receiving unit is constantly driven when the code phase is within a predetermined edge of a pseudorandom noise (PRN) code.

* * * * *